United States Patent
Katukam et al.

(10) Patent No.: US 7,031,253 B1
(45) Date of Patent: Apr. 18, 2006

(54) METHOD AND APPARATUS FOR COMPUTING A PATH THROUGH SPECIFIED ELEMENTS IN A NETWORK

(75) Inventors: Suresh Katukam, Rohnert Park, CA (US); Venkataraman Anand, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 800 days.

(21) Appl. No.: 09/872,141

(22) Filed: Jun. 1, 2001

(51) Int. Cl.
*G01R 31/08* (2006.01)

(52) U.S. Cl. .................. 370/222; 370/258; 370/400

(58) Field of Classification Search ............. 370/256, 370/254, 255, 236, 351, 400, 225, 222
See application file for complete search history.

(56) References Cited

U.S. PATENT DOCUMENTS

| | | | |
|---|---|---|---|
| 5,253,248 A | 10/1993 | Dravida et al. ............. 370/16 |
| 5,459,716 A | 10/1995 | Fahim et al. |
| 5,467,345 A | 11/1995 | Cutler, Jr. et al. ........... 370/60 |
| 5,497,368 A | 3/1996 | Reijnierse et al. ........... 370/54 |
| 5,546,542 A * | 8/1996 | Cosares et al. ............. 709/241 |
| 5,627,822 A | 5/1997 | Edmaier et al. ............. 370/218 |
| 5,854,899 A | 12/1998 | Callon et al. ......... 395/200.68 |
| 5,901,137 A | 5/1999 | Nakabayashi |
| 5,923,646 A | 7/1999 | Mandhyan |
| 5,942,989 A * | 8/1999 | Nagasawa et al. ......... 370/236 |
| 6,026,394 A | 2/2000 | Tsuchida et al. |
| 6,073,248 A * | 6/2000 | Doshi et al. ................ 714/4 |
| 6,078,590 A | 6/2000 | Farinacci et al. ........... 370/432 |
| 6,104,699 A * | 8/2000 | Holender et al. ........... 370/235 |
| 6,130,875 A * | 10/2000 | Doshi et al. ............... 370/225 |
| 6,185,210 B1 | 2/2001 | Troxel ...................... 370/395 |
| 6,249,510 B1 | 6/2001 | Thompson |
| 6,430,150 B1 | 8/2002 | Azuma et al. |
| 6,567,194 B1 | 5/2003 | Badr |
| 6,614,754 B1 | 9/2003 | Usuba et al. |
| 6,646,990 B1 | 11/2003 | Gray et al. |
| 6,671,819 B1 | 12/2003 | Passman et al. |
| 6,728,205 B1 * | 4/2004 | Finn et al. .................. 370/217 |
| 6,744,769 B1 | 6/2004 | Siu et al. |
| 6,751,190 B1 | 6/2004 | Swallow |
| 6,765,880 B1 | 7/2004 | Hillard et al. |
| 6,775,477 B1 | 8/2004 | Badr |
| 6,785,224 B1 * | 8/2004 | Uematsu et al. ............ 370/222 |
| 6,798,747 B1 * | 9/2004 | Watkins et al. ............. 370/238 |
| 2001/0019540 A1 | 9/2001 | Uematsu et al. |
| 2002/0027885 A1 * | 3/2002 | Ben-Ami .................... 370/254 |
| 2002/0054572 A1 * | 5/2002 | Saleh et al. ................ 370/254 |
| 2002/0141334 A1 | 10/2002 | Deboer et al. |
| 2003/0076816 A1 | 4/2003 | Naranjo et al. |
| 2003/0133417 A1 * | 7/2003 | Badt, Jr. .................... 370/254 |

* cited by examiner

*Primary Examiner*—Chau Nguyen
*Assistant Examiner*—Ian N. Moore
(74) *Attorney, Agent, or Firm*—Aka Chan LLP

(57) ABSTRACT

Methods and apparatus for automatically creating a circuit path that includes specified elements are disclosed. According to one aspect of the present embodiment, a method for computing a circuit path between a source node and a destination node of a network includes identifying at least a first element that is to be traversed by the circuit path such that the path passes from the source node, traverses the first element, then passes to the destination node. The method also includes routing a first segment of the circuit path automatically such that the source node and the first element are components of the first segment. In one embodiment, routing the first segment automatically includes routing the first segment automatically using a shortest path first algorithm.

20 Claims, 12 Drawing Sheets

METHOD AND APPARATUS FOR COMPUTING A PATH THROUGH SPECIFIED ELEMENTS IN A NETWORK

BACKGROUND OF THE INVENTION

1. Field of Invention

The present invention relates generally to data communication systems. More particularly, the present invention relates to systems and methods for substantially automating the computation of a circuit path between two nodes that includes specified network elements and network links.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET) is becoming more prevalent. One type of SONET network, or one type of network that is subject to SONET standards is a time division multiplexing (TDM) network. TDM networks generally allocate single channels or lines to be used amongst multiple users, or customers of data communication services. The single channels may each be divided into slots of time during which each user has access to the single channels. In general, the availability of a link between nodes for consideration as a part of a circuit path requires that TDM bandwidth is available on that link for the circuit being routed.

A network such as a TDM network is generally designed to ensure that information may be transferred between nodes within the network. Often, within a network, information is transferred between two specified nodes, i.e., a source node which sends information and a destination node which receives information. When information is to be sent between a source node and a destination node, a circuit path between the two nodes must be computed so that leased line services may be provided. FIG. 1 is a diagrammatic representation of a network in which leased line services may be provided. A network 104 includes nodes 108 and links 112. Nodes 108 include a source node A 108a and a destination node Z 108z. In order for information to be sent from source node A 108a to destination node Z 108z, a circuit path between source node A 108a and destination node Z 108z must be identified.

A routing algorithm is generally used to route a path between source node A 108a and destination node Z 108z, once source node A 108a and destination node Z 108z have been identified, e.g., by a network administrator. Often, a routing algorithm which routes a path between source node A 108a and destination node Z 108z is a shortest path first algorithm which identifies the shortest path, or the path which includes the fewest nodes, between source node A 108a and destination node Z 108z. As shown, a path 116 that is routed between source node A 108a and destination node Z 108z is the shortest path between source node A 108a and destination node Z 108z. Hence, leased line services may be provided using path 116.

At times, in order to provide new services or to balance the load within a network such as network 104, a network administrator may wish to create circuits which are required to traverse specific nodes or links. As will be appreciated by those skilled in the art, certain nodes may be specified as being required when drops are to be added at the nodes, while certain links may be specified as being required to balance the load within a network. FIG. 2 is a diagrammatic representation of a network in which two particular nodes are required to be accessible from a third node. A network 204 includes nodes 208 and links 212. Nodes 208 include source node A 208a, as well as node C 208c and node F 208f which are to be traversed. Specifically, a circuit path is to first traverse node F 208f before reaching node C 208c, which may be considered to be a destination node.

If a conventional shortest path first algorithm is to be used to access node A 208a, node F 208f, and node C 208c, a network administrator typically may specify that a circuit path 216 between node A 208a and node F 208f be created, then that a circuit path 218 between node A 208a and node F 208f be created. The use of individual paths 216, 218 is generally not acceptable when node F 208f is to be used as a drop between node A 208a and node C 208c. That is, a conventional shortest path first algorithm is generally not capable of creating a path given a criterion which specifies that an "intermediate" node 208 or link 212 must be traversed when a path between node A 208a and node C 208c is created.

In order to route a path 220 between node A 208a and node C 208c which includes a required element such as node F 208f, a network administrator must manually create path 220. In creating path 220, the network administrator manually routes segment 220a between node A 208a and node F 208f, then routes segment 220b between node F 208f and node C 208c.

Manually routing a path between a source node and a destination node is time consuming and, hence, inefficient, particularly in large networks. Further, when a path is manually routed, the likelihood that the path is routed incorrectly increases. For example, although a shortest available path may be desired, human error may result in a manually routed path not being the shortest path between the source node and the destination node that includes required elements. Such an error may cause an overall network to operate inefficiently. Manually routing a path may also result in paths which erroneously mix protected links with unprotected links, or paths which traverse required elements in an incorrect order.

Therefore, what is needed is an efficient method and apparatus for creating circuit paths which include required elements. That is, what is desired is an efficient system which enables circuit paths that traverse required elements in a specified order to be created substantially automatically.

SUMMARY OF THE INVENTION

The present invention relates to a system for substantially automatically creating a circuit path which traverses a required set of elements. According to one aspect of the present invention, a device for creating a path which includes a third element between a first element and a second element of a network includes a first mechanism that identifies the third element. The device also includes a second mechanism which computes a path between the first element and the second element such that the path traverses the third element. In one embodiment, the first element, the second element, and the third element are nodes.

In another embodiment, the first mechanism identifies the third element as being a component of the path, and further identifies a fourth element as being a component of the path that is to be traversed sequentially after the third element is traversed. In such an embodiment, the second mechanism may also compute a first segment associated with the first element and the third element, while the third mechanism substantially prevents the fourth element and the second element from being associated with the first segment.

The ability to substantially automatically create a circuit path which traverses a set of specified elements in a specified order enables circuit paths which meet elemental constraints to be readily created. Reducing the amount of time needed to create circuit paths which include specified elements generally enables an overall network to operate more efficiently. Further, the ability to substantially automatically create a circuit path which traverses specified elements typically enables a particular type of path, e.g., a shortest path or a least-switched path, which meets specified criteria to be efficiently created.

According to another aspect of the present invention, an apparatus for routing a path between a source node and a destination node of a network which has a plurality of elements includes an identifier, a blocker, and a path router. The identifier identifies a set of elements that are to be included in the path, while the blocker blocks at least a first element of the set from being used in computing a first segment of the path. The path router generates the first segment such that the first segment includes the source node and a second element of the set, and does not include the first element.

In one embodiment, the blocker effectively blocks substantially all elements included in the set of elements except for the second element from being used in generating the first segment of the path. In such an embodiment, the blocker unblocks the second element after the first segment is generated, and also blocks at least one element that is a component of the first segment and is included in the plurality of elements from being included in a second segment of the path.

According to still another aspect of the present invention, a method for computing a circuit path between a source node and a destination node of a network includes identifying at least a first element that is to be traversed by the circuit path such that the path passes from the source node, traverses the first element, then passes to the destination node. The method also includes routing a first segment of the circuit path automatically such that the source node and the first element are components of the first segment. In one embodiment, routing the first segment automatically includes routing the first segment automatically using a shortest path first algorithm.

In another embodiment, the method additionally includes identifying a second element that is to be traversed by the circuit path between the first element and the destination node, and blocking the second element from being available for use in routing the first segment automatically. Routing the first segment automatically then includes routing the first segment to substantially avoid including the second element as a component. In such an embodiment, the method may also include blocking the destination node from being available for use in routing the first segment automatically such that routing the first segment automatically further includes routing the first segment to substantially avoid including the destination node as a component.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Within a network such as a time division multiplexing (TDM) network which is subject to synchronous optical network (SONET) standards, manually routing paths between source nodes and destination nodes often proves to be time consuming and inefficient. In addition, when a path is manually routed, the likelihood that the path is routed incorrectly increases. Paths are often manually routed, as for example when a path between two nodes is constrained to traverse specified, e.g., required, network elements such as nodes and links. Conventional routing algorithms, such as shortest path first algorithms, are typically not able to create paths given criterion such as elements which must be traversed in a path between a source node and a destination node.

Paths which are constrained to traverse specified elements are often required in order for drops associated with traversed nodes to be added, as well as for load balancing within a network. Load balancing within a network is often achieved by specifying a particular network link, i.e., a network link which is not overloaded, to be included. By providing a routing algorithm, e.g., a shortest path first algorithm, which is suitable for substantially automatically creating a circuit path which traverses a set of specified elements in a specified order, the time associated with creating such a circuit path may be reduced. That is, a substantially automatic method for creating a circuit path which traverses a set of specified elements in a specified order enables the path to be created efficiently. Further, the likelihood of errors associated with misrouting a circuit path or failing to include some specified elements may be significantly reduced.

Figure 1:
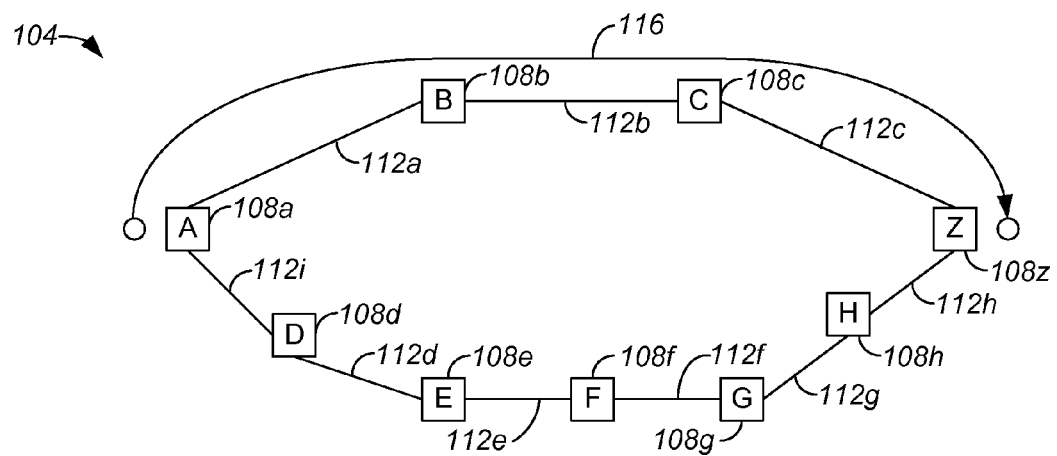
FIG. 1 is a diagrammatic representation of a shortest path between two nodes of a network.
Figure 2:
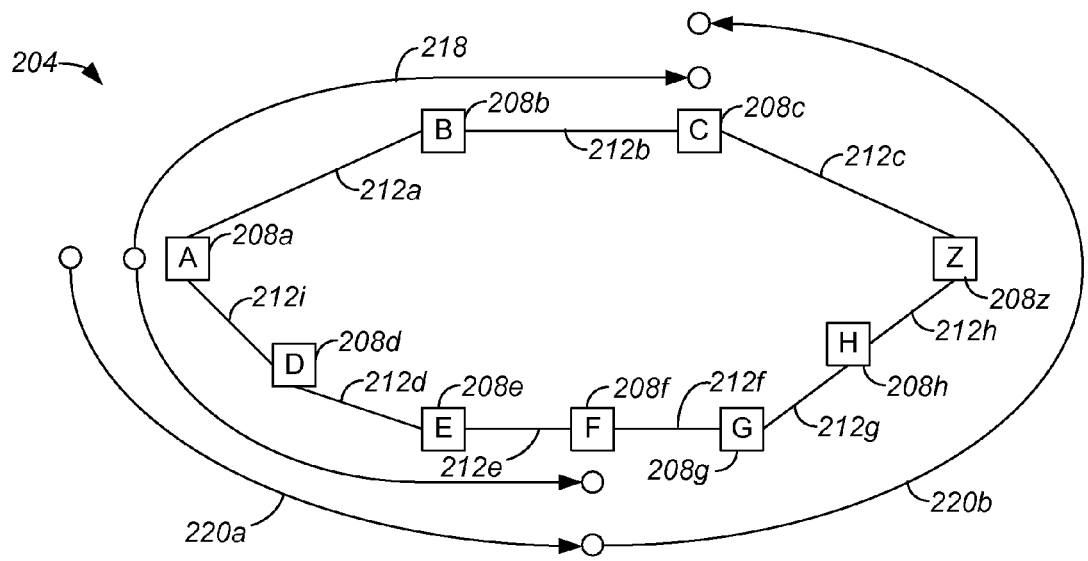
FIG. 2 is a diagrammatic representation of a network in which two particular nodes are to be accessed.
Figure 3A:
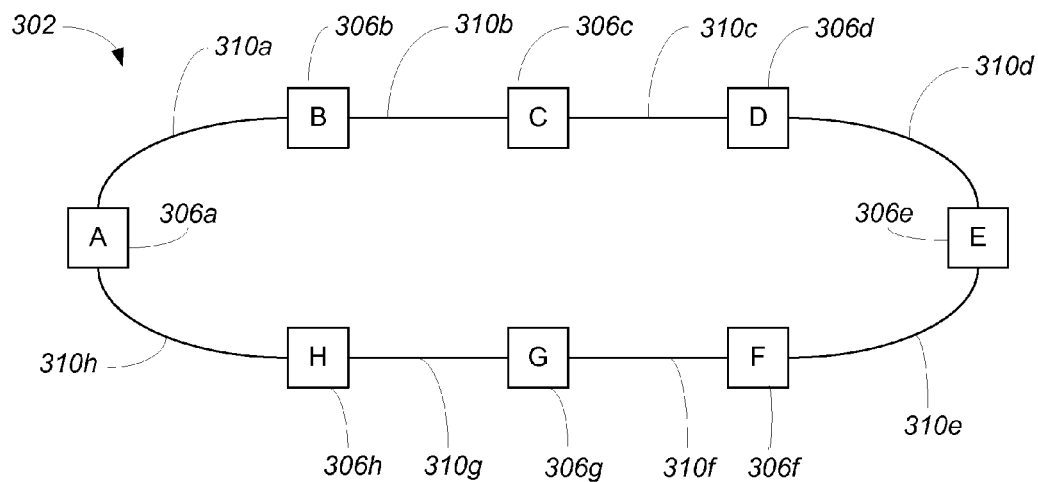
FIG. 3a is a diagrammatic representation of a first network which includes nodes and links.

In order to enable specified elements to be traversed in a specified order, a routing algorithm generally ensures that when one particular specified element is being addressed, i.e., when a path segment associated with a particular specified element is being computed, the other specified elements are not available for use in creating a path segment associated with the particular specified element. With reference to FIG. 3a, the creation of a path segment which is associated with a particular specified element, but does not include other specified elements, will be described.

FIG. 3a is a diagrammatic representation of a first network which includes elements such as nodes and links. A network 302 includes nodes 306 and links 310, e.g., fibers, which are at least partially interconnected. A network administrator or other user may specify a source node and a destination node, i.e., a start point and an end point, for a circuit path within network 302. The network administrator may also specify network elements, e.g., nodes and/or links, a circuit path is to traverse or otherwise include. As will be appreciated by those skilled in the art, such specified elements may generally include elements which have enough available bandwidth for use in transmitting data signals. Nodes may be specified to enable drops to be added, while links may be specified in an effort to balance the load within network 302.

Within network 302, a network administrator may specify that a source node be node A 306a, and that a destination node be node D 306d. The network administrator may also specify that before information reaches node D 306d from node A 306a, the information should be received on a node F 306f. In other words, it may be specified that information should be passed first from node A 306a to node F 306f, prior to being passed to node D 306d. As such, node D 306d may not be included in a circuit path segment between node A 306a and node F 306f.

Figure 3B:
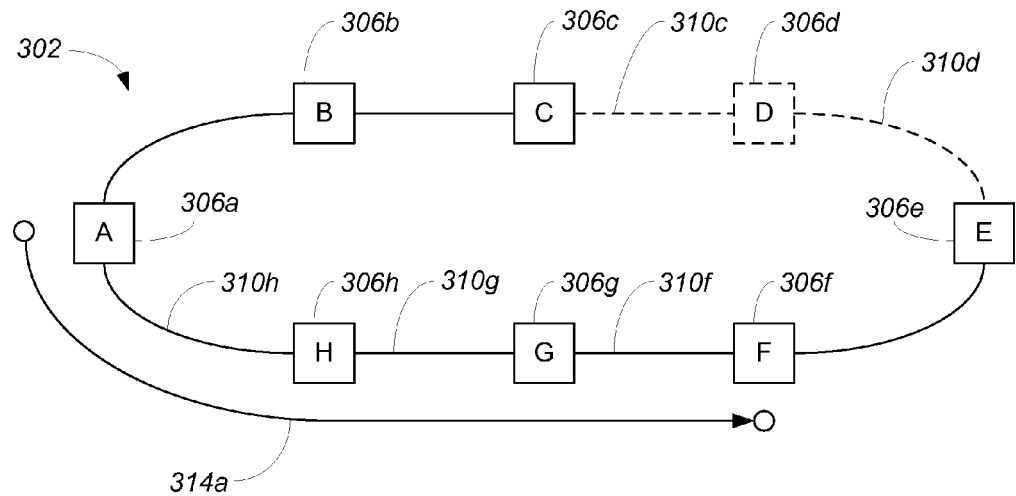
FIG. 3b is a diagrammatic representation of a network, i.e., network 302 of FIG. 3a, in which a node is blocked from access in routing a segment in accordance with an embodiment of the present invention.

With reference to FIG. 3b, the creation of a path segment between node A 306a and node F 306f will be described in accordance with an embodiment of the present invention. In order to prevent a path routing algorithm from using node D 306d as a component of a segment between node A 306a and node F 306f, node D 306d is blocked. Blocking node D 306d may include placing node D 306d in a list of blocked network elements which the routing algorithm uses to effectively eliminate the use of some elements from consideration when creating a segment. As indicated in FIG. 3b, blocking node D 306d effectively blocks any links 310, e.g., links 310c and 310d, from being included in a segment from node A 306a and node F 306f.

A segment 314a from node A 306a to node F 306f which meets constraints, i.e., which does not pass through node D 306d, passes through node H 306h and node G 306g. In the embodiment as shown, segment 314a is effectively the only path between node A 306a and node F 306f which does not include node D 306d. However, it should be understood that when there is more than one possible route or segment between two nodes that meets routing constraints, a routing algorithm will generally select the most appropriate segment. By way of example, a shortest past first algorithm may select the segment that includes the least number of nodes, while a load-balancing algorithm may select the segment which supports the smallest load.

Figure 3C:
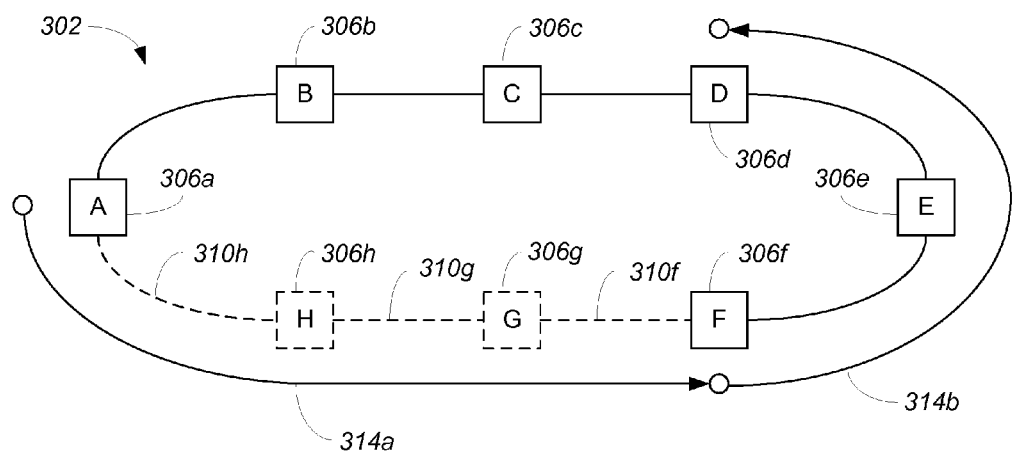
FIG. 3c is a diagrammatic representation of a network, i.e., network 302 of FIG. 3a, in which the components of a segment are blocked from access in routing another segment in accordance with an embodiment of the present invention.

Once specific nodes 306 or links 310 have been included in a segment, those specific nodes 306 or links 310 may not be used in another segment. As such, none of node H 306h and node G 306g, or links 310f–h, may be included in a segment from node F 306f to node D 306d. Source node A 306a is typically also not available for use in a subsequent segment. FIG. 3c is a diagrammatic representation of an overall circuit path between node A 306a and node D 306d in accordance with an embodiment of the present invention. Node H 306h and node G 306g, as well as links 310 which either begin or terminate at node H 306h or node G 306g, are blocked from being included in a segment 314b which provides a path between node F 306f and node D 306d, as shown. Hence, an overall circuit path 314 between node A 306a and node D 306d such that node F 306f is included includes component segments 314a and 314b.

Although the shortest path between node A 306a and node D 306d passes through only two intermediate nodes, i.e., node B 306b and node C 306c, the shortest path does not pass through node F 306f as required. The shortest path between node A 306a and node D 306d which includes node F 306f is shown by path 314. Therefore, using a routing algorithm such as a shortest path first algorithm that is subject to constraints, i.e., a required element within a path, to find the shortest path between a source node and a destination node may not necessarily be the absolute shortest path between the source node and the destination node. Instead, the path between the source node and the destination node may be the shortest path that includes the source node, the destination node, and any required elements.

The absolute shortest path between node F 306f and node D 306d passes through node E 306e. As such, blocking node H 306h and node G 306g effectively does not affect the creation of segment 314b using a shortest path first routing algorithm, since the absolute shortest path between node F 306f and node D 306d does not include elements included in segment 314a. In general, however, blocking certain network elements from being used in creating a circuit path may often cause the path to be longer than it would be if the network elements were not blocked, as will be discussed below with respect to FIGS. 4a–f.

Figure 4A:
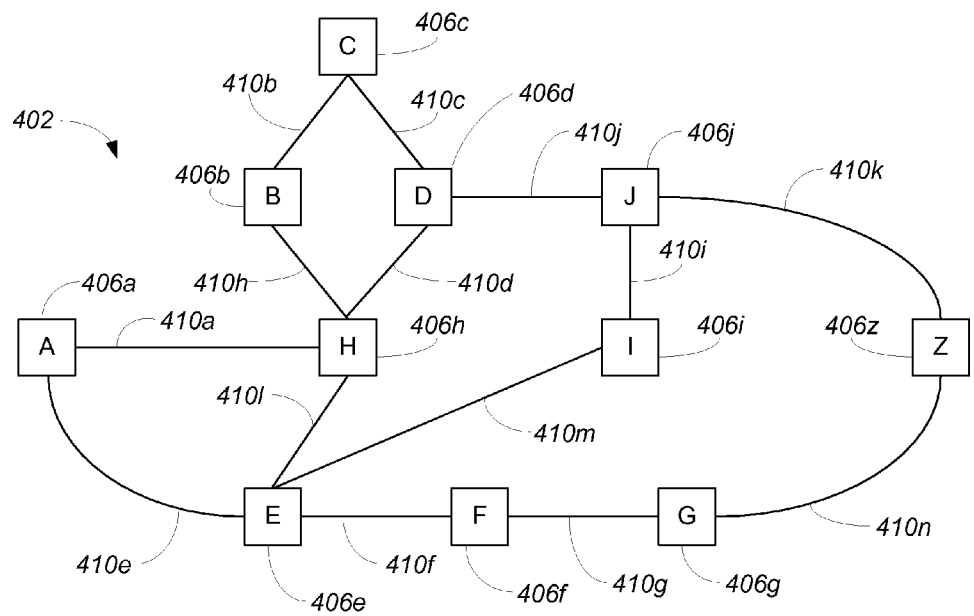
FIG. 4a is a diagrammatic representation of a second network which includes nodes and links.

FIG. 4a is a diagrammatic representation of a second network which includes nodes and links. Nodes 406 and links 410 are interconnected within a network 402 such that certain nodes 406 are associated with multiple links. For instance, node E 406e is effectively associated with links 410e, 410f, 410l, and 410m. A network administrator may specify a required set of elements which are to be included in a particular order in a circuit path within network 402. Specifically, the network administrator may specify a source node and a destination node for a circuit path. Other network elements, e.g., nodes and/or links, which a circuit path is to include may also be specified.

In the described embodiment, a circuit path from a source node A 406a and a destination node Z 406z is to be created. Specifically, a circuit path between node A 406a and node Z 406z is to be created such that the circuit path includes node B 406b, node C 406c, node D 406d, and node E 406e as components of the circuit path. Hence, segments included in the circuit path are to be routed such that one segment is routed between node A 406a and node B 406b, one segment is routed between node B 406b and node C 406c, one segment is routed between node C 406c and node D 406d, one segment is routed between node D 406d and node E 406e, and one segment is routed between node E 406e and node Z 406z.

Figure 4B:
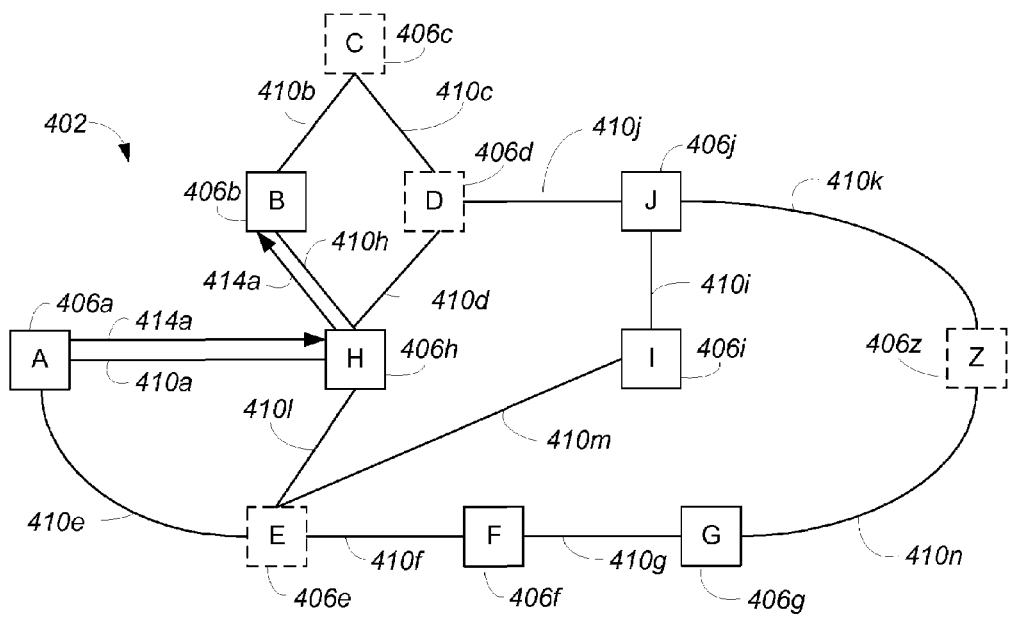
FIG. 4b is a diagrammatic representation of a network, i.e., network 402 of FIG. 4a, in which elements are blocked from access in routing a first segment of an overall path in accordance with an embodiment of the present invention.

Referring next to FIG. 4b, the routing of a path segment between node A 406a and node B 406b will be described in accordance with an embodiment of the present invention. A segment that is computed between node A 406a and node B 406b may not include any other required elements of an overall circuit path. As such, node C 406c, node D 406d, node E 406e, and node Z 406z are blocked, as shown, in order to create a segment between node A 406a and node B 406b.

Taking blocked nodes 406 into account, a segment 414a between node A 406a and node B 406 may be routed. As shown, segment 414a passes through node H 406h, and uses link 410a and link 410h. It should be appreciated that if the routing method used to create a segment uses a shortest path first algorithm, even without blocked nodes, segment 414a would be the result of the routing method. That is, segment 414a represents both a shortest path between node A 406a and node B 406b given no required element constraints, and the shortest path between node A 406a and node B 406b given the required element constraints mentioned above.

Once segment 414a is computed, nodes 406 associated with segment 414a are blocked out in order to route a segment between node B 406b and node C 406c. While node B 406b may be considered as being blocked since node B 406b is effectively the end point of segment 414a, it should be appreciated that node B 406b is effectively the beginning point of the segment between node B 406b and node C 406c. In other words, node B 406b is a component of segment 414a which may be considered to be a component of the segment between node B 406b and node C 206c.

Figure 4C:
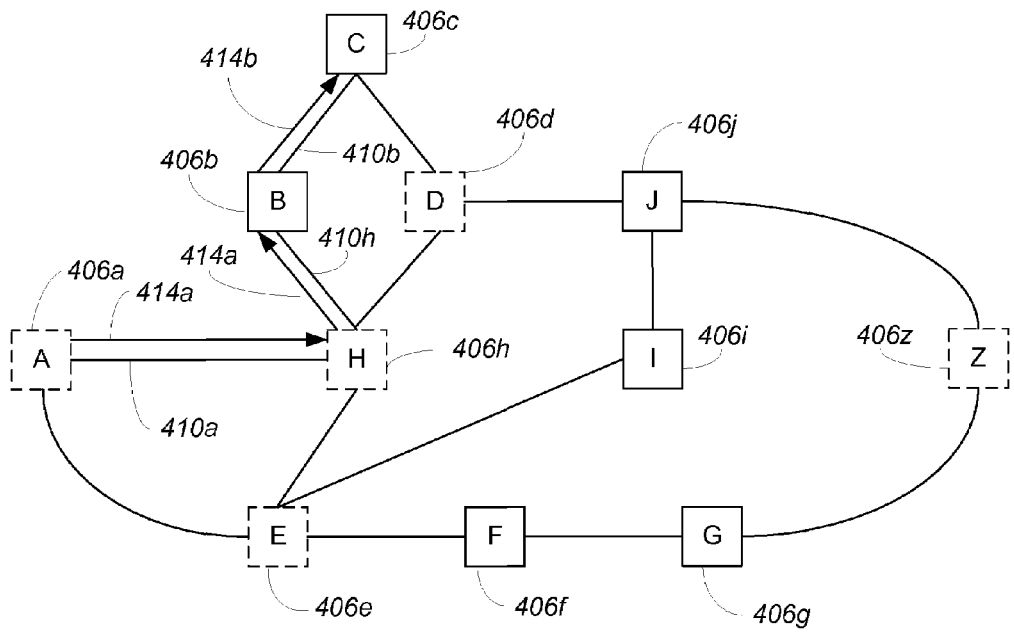
FIG. 4c is a diagrammatic representation of a network, i.e., network 402 of FIG. 4a, in which elements are blocked from access in routing a second segment of an overall path in accordance with an embodiment of the present invention.

Typically, links 410 that are associated with segment 414a are also blocked out. As shown in FIG. 4c, node A 406a and node H 406h are blocked out. Hence, link 410a and link 410h are effectively blocked out as well. While node C 406c is unblocked since node C 406c is to be the termination point of the next segment that is routed, node D 406d, node E 406e, and node Z 406z remain blocked.

A segment 414b effectively includes one link 410b which provides a substantially direct connection between node B 406b and node C 406c. Given that the only other link 410 associated with node B 406b, namely link 410h, is included in segment 414a, it should be appreciated that specifying that a segment is to be routed between node B 406b and node C 406c is substantially equivalent to specifying that link 410b is a required element.

Figure 4D:
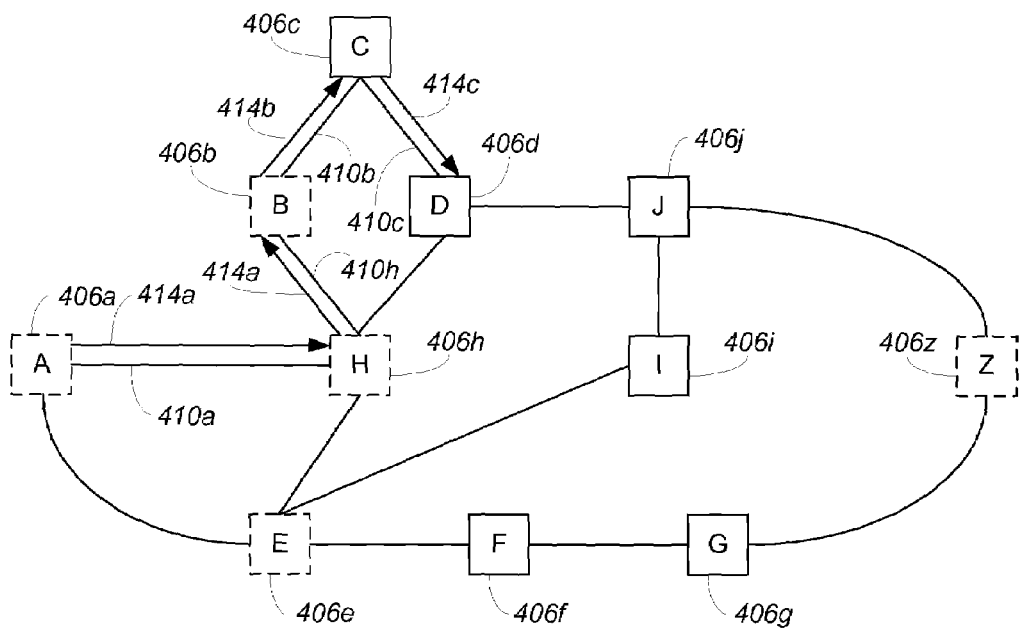
FIG. 4d is a diagrammatic representation of a network, i.e., network 402 of FIG. 4a, in which elements are blocked from access in routing a third segment of an overall path in accordance with an embodiment of the present invention.

A segment is also to be computed between node C 406c and node D 406d. Hence, as shown in FIG. 4d, node D 406d is unblocked, and node B 406b is added to a list or group of blocked elements. Blocking node B 406b, which is a part of segment 414a and segment 414b, effectively blocks link 410b. Since link 410c is the only link 410 which is accessible from node C 406c, and link 410c terminates at node D 406d, link 410c essentially makes up a segment 414c between node C 406c and node D 406d.

Figure 4E:
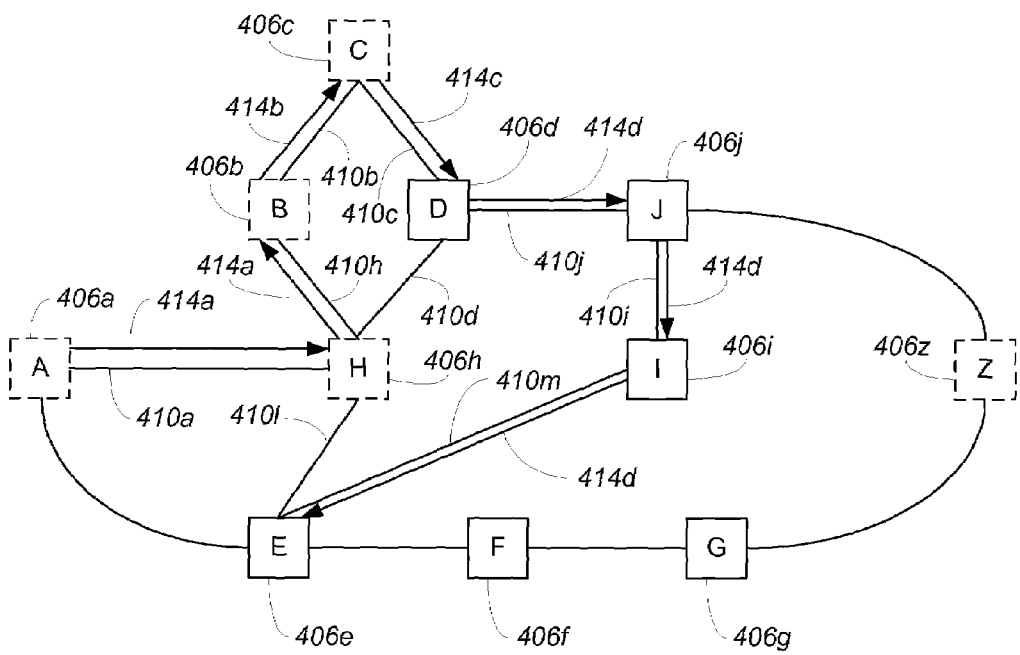
FIG. 4e is a diagrammatic representation of a network, i.e., network 402 of FIG. 4a, in which elements are blocked from access in routing a fourth segment of an overall path in accordance with an embodiment of the present invention.

FIG. 4e shows a segment 414d which is routed between node D 406d and node E 406e in accordance with an embodiment of the present invention. Nodes 406 which are associated with segments 414a–c, aside from node D 406d, are blocked, as is destination node Z 406z. The shortest path between node D 406d and node E 406e would include links 410d and 410l, as well as node H 406h. However, since node H 406h is blocked, the shortest path between node D 406d and node E 406e is not available for use in an overall circuit path. Therefore, segment 414d is effectively the shortest available path between node D 406d and node E 406e which is available.

As will be appreciated by those skilled in the art, specifying that certain network elements are required elements in an overall circuit path and have a required order in the overall circuit path may result in the overall circuit path being relatively long. That is, an overall path between node A 406a and node Z 406z would likely be shorter when there are no required elements to be accounted for. In general, the more required elements there are in a circuit path, the longer the overall path between a source node and a destination node will be. However, it is often necessary to specify required elements, as for example when drops are to be implemented.

Figure 4F:
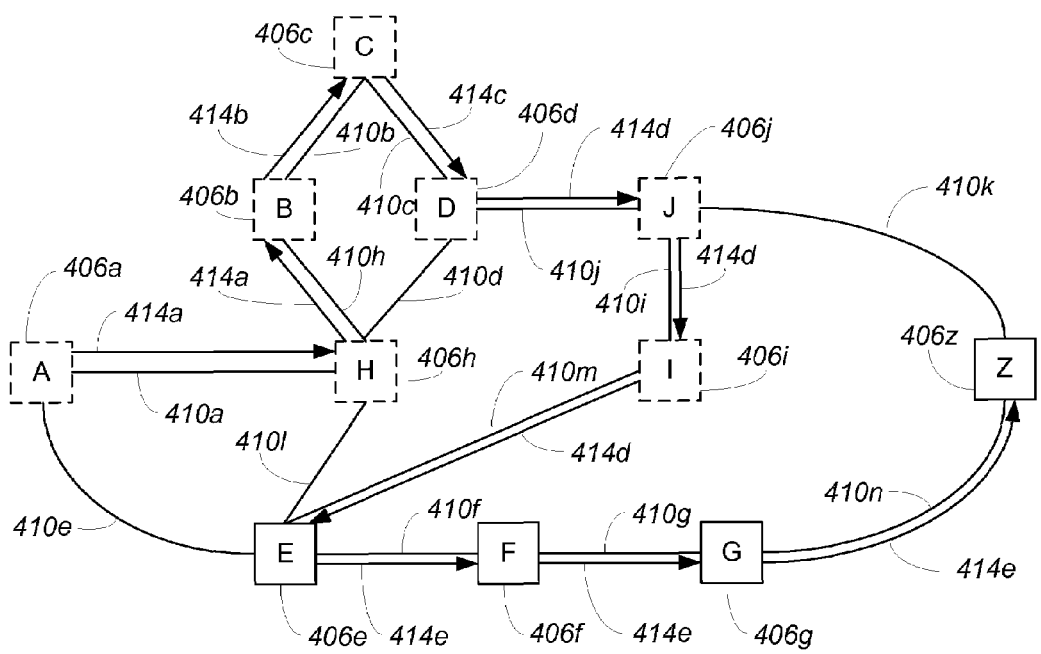
FIG. 4f is a diagrammatic representation of a network, i.e., network 402 of FIG. 4a, in which elements are blocked from access in routing a fifth segment of an overall path in accordance with an embodiment of the present invention.

To complete an overall circuit path between source node A 406a and destination node Z 406z which includes node B 406b, node C 406c, and node D 406d, all nodes 406 included in segments 414a–d are blocked, with the exception of node E 406e, as shown in FIG. 4f. Node Z 406z is unblocked, as node Z 406z is the destination node 406 of a segment 414e which originates at node E 406e. Segment 414e, which includes node F 406f and node G 406g, completes an overall circuit path 414 between node A 406a and destination node Z 406z.

Figure 4G:
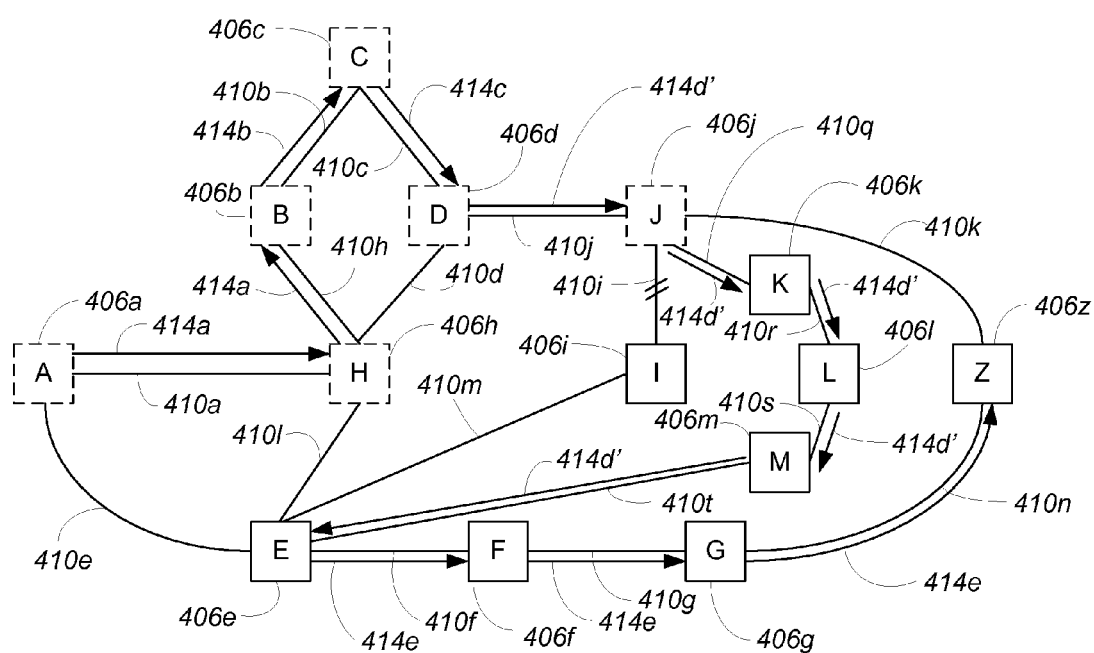
FIG. 4g is a diagrammatic representation of a network, i.e., network 402 of FIG. 4a, in which a link is unavailable in accordance with an embodiment of the present invention.

Although a shortest path algorithm generally identifies the shortest segment 414 in existence between required nodes 406, it should be understood that the shortest segment in existence between two require nodes 406 may not always be available. For instance, a link 410 in the shortest segment 414 may be full, i.e., no bandwidth may be available on the link 410, thereby substantially preventing the shortest segment 414 in existence from being used. By way of example, if every link 410 has available bandwidth, the shortest path between node D 406d and node E 406e, which are both required elements as discussed above, uses link 410j, link 410i, and link 410m. However, when link 410i is full and, therefore, unavailable as shown in FIG. 4g, then link 410i may not be included in a segment between node D 406d and node E 406e. As such, although a segment 414d', which includes links 410q–t, is not the shortest segment or path in existence between node D 406d and node E 406e, segment 414d' may be implemented because segment 414d' is the shortest available path. That is, when links 410q–t have available bandwidth while link 410i does not, links 410q–t are used in segment 414d' between required node D 406d and required node E 406e.

Figure 5A:
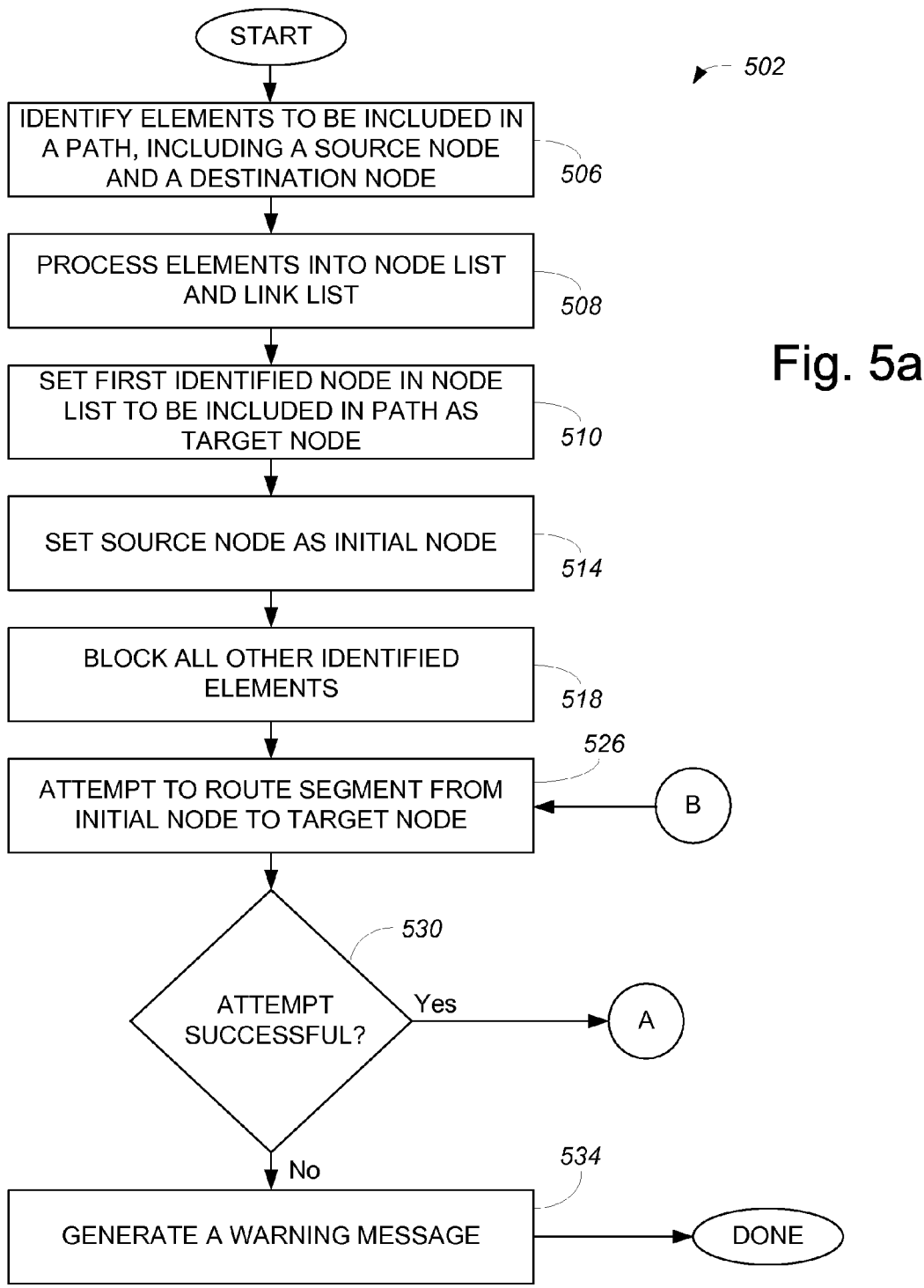
FIGS. 5a–c are a process flow diagram which illustrates the steps associated with routing a circuit path which includes specific elements in accordance with an embodiment of the present invention.
Figure 5B:
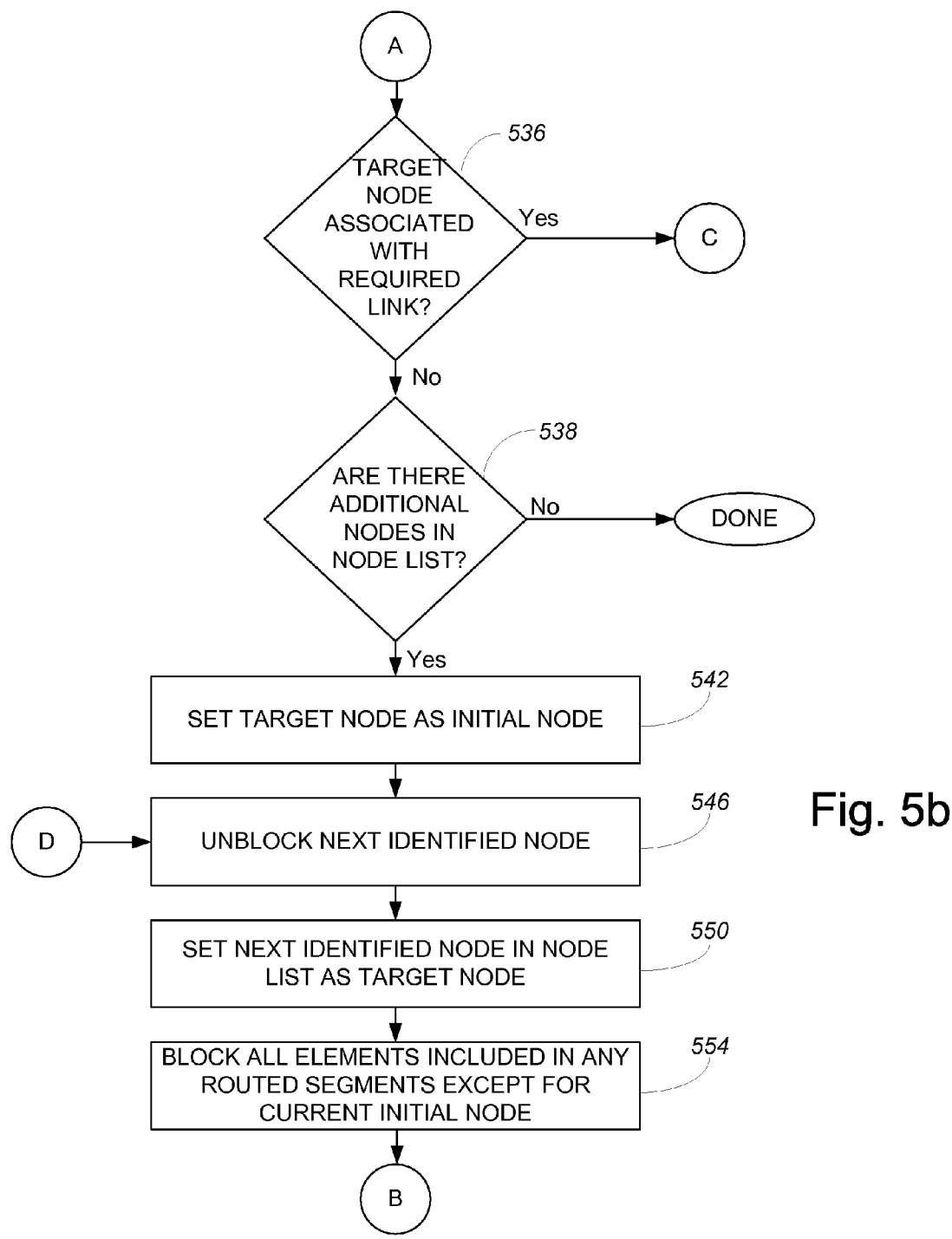
Figure 5C:
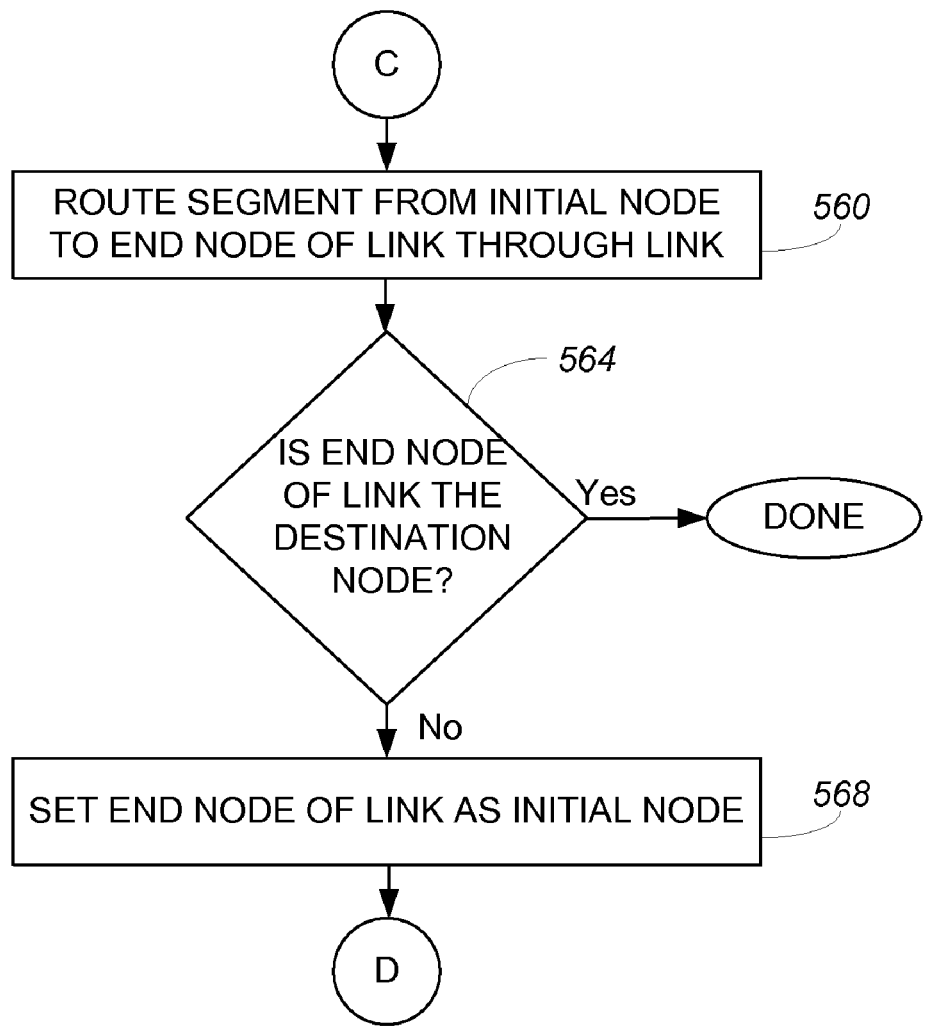

With reference to FIGS. 5a–c, one method of routing a circuit path through specified network elements will be described in accordance with an embodiment of the present invention. A process 502 of routing a circuit path begins at step 506 in which elements that are to be included in a path are identified. Generally, the elements include nodes, e.g., a source node and a destination node, and links. In one embodiment, the elements that are to be included in a path are identified by software running on a computing device, as will be discussed below with respect to FIG. 6a, or by firmware, once the elements are provided by a network administrator or other user.

Typically, the elements may be provided in a logical order. That is, the elements may be provided in the order in which they are to be routed. For instance, a source node may be provided, followed by any nodes and links which are to be used in a circuit path, as well as a destination node. Although specifying the elements in a logical, or sequential, order is preferred, it should be appreciated that the elements may be specified in substantially any suitable order.

When a link is specified as an element that is to be included in a path, nodes associated with the link may also be identified as being elements that are to be included in the path. In other words, nodes at either end of a link that is identified as a required network element are also typically identified as required network elements. The nodes associated with the required link may be identified as being required elements because the link may only be reached through the associated nodes.

Once the elements to be included in a path are identified in step 506, in one embodiment, the elements are processed into a node list and a link list in step 508. The node list includes nodes that are to be included in the path, in addition to the starting node of each link that is to be included in the path. That is, each link that is to be included in the path is represented in the node list by the starting node associated with each link. After the elements are processed, a first identified node in the node list that is to be included in the path is set as a target node in step 510. The first identified node that is to be included in the path is generally at least associated with the first element specified after the source node is specified. For example, the first identified node may be the first node specified after the source node is specified, or the first identified node may be a node associated with a first link specified after the source node is specified. After the first identified node is set as a target node, the source node is set as an initial node in step 514. Setting the source node as an initial node effectively specifies that the source node is the starting point of a circuit path which includes the elements specified in step 506.

Identified elements other than the target node and the source node are blocked in step 518. Blocking the other identified elements effectively eliminates the other identified elements from being included in a path segment that includes the target node and the source node. Once elements are blocked, process flow proceeds to step 526 in which an attempt is made to route a path segment from the initial node to the target node. Substantially any suitable method may be used to route the segment. Suitable methods include, but are not limited to, a method which uses a shortest path first algorithm.

A determination is made in step 530 regarding whether the attempt to route a segment was successful. If the determination is that the attempt was not successful, then the indication is often that no path between the initial node and the target node exists which does not include at least one of the blocked elements. Accordingly, a warning message may be generated in step 534 which indicates that a circuit path could not be created which includes the elements identified in step 506 in a specified order. Upon the generation of the warning message, the process of routing a circuit path is effectively completed.

Alternatively, if the determination in step 530 is that a segment from the initial node to the target element has been successfully routed, then it is determined in step 536 whether the target node is associated with a link that is to be included in the overall circuit path. That is, it is determined if the target node is the start node of a link specified in the link list. When it is determined that the target node is not the start node of a specified link, it is determined in step 538 whether there are additional identified nodes which are to be included in the overall circuit path. That is, it is determined whether the overall circuit path has been successfully created. If it is determined that there are not additional identified nodes that are specified, then the circuit path is considered to be created, and the process of routing a circuit is completed. On the other hand, if it is determined that there are additional identified nodess which are to be included in a circuit path, then in step 542, the target node is set as a new initial node. In other words, the starting node of the next segment will be the target node which was the ending node of the previous segment.

After the target node is set as a new initial node, the next identified node in the specified order, e.g., included in the node list, is unblocked in step 546. Unblocking the next identified node enables the newly unblocked next identified node to be set in step 550 as a target node and, hence, be included as a part of the next segment to be routed. In the described embodiment, any nodes and links which were included in previous segments, except for the new initial node, may not be included in the next segment to be routed. Hence, substantially all elements, aside from the new initial node, which were included in any routed segments are blocked in step 554. Once the "used" elements are blocked, process flow proceeds to step 526 in which an attempt is made to route a segment between the initial node and the target node.

Returning to step 536, if it is determined that the target node is associated with a required link, then a segment is routed from the initial node or starting node of the required link to the end node of the required link in step 560. In other words, the required link associated with the target node is added to the overall circuit path. Then, a determination is made in step 564 as to whether the end node of the link is the destination node of the overall circuit path.

If it is determined in step 564 that the end node of the link is the destination node, then the process of routing a circuit path is completed. Alternatively, if it is determined that the end node of the link is not the destination node, then the end node of the link is set as an initial node in step 568. Once the end node of the link is set, process flow proceeds to step 546 in which the next identified node in the node list is unblocked.

As previously mentioned, a routing method or algorithm may be executed on a computing device. In general, a circuit path which includes specified intermediate elements may be computed substantially automatically, i.e., with relatively little input if any from a network administrator or a user. That is, in lieu of having a network administrator specify an entire path manually, substantially the entire alternate circuit path may be defined automatically using a routing method, with minimal input from the network administrator. The network administrator may provide little more than a list of required elements as input to a routing algorithm. The input may either be provided to a routing algorithm associated with a computer which is in communication with at least one node in a network, or substantially directly to a node with an associated routing algorithm. A system in which a path is defined by a computer that is in communication with a network will be described below with respect to FIG. 6a, while a system in which an alternate circuit path is defined by a node in a network will be described below with respect to FIG. 6b.

Figure 6A:
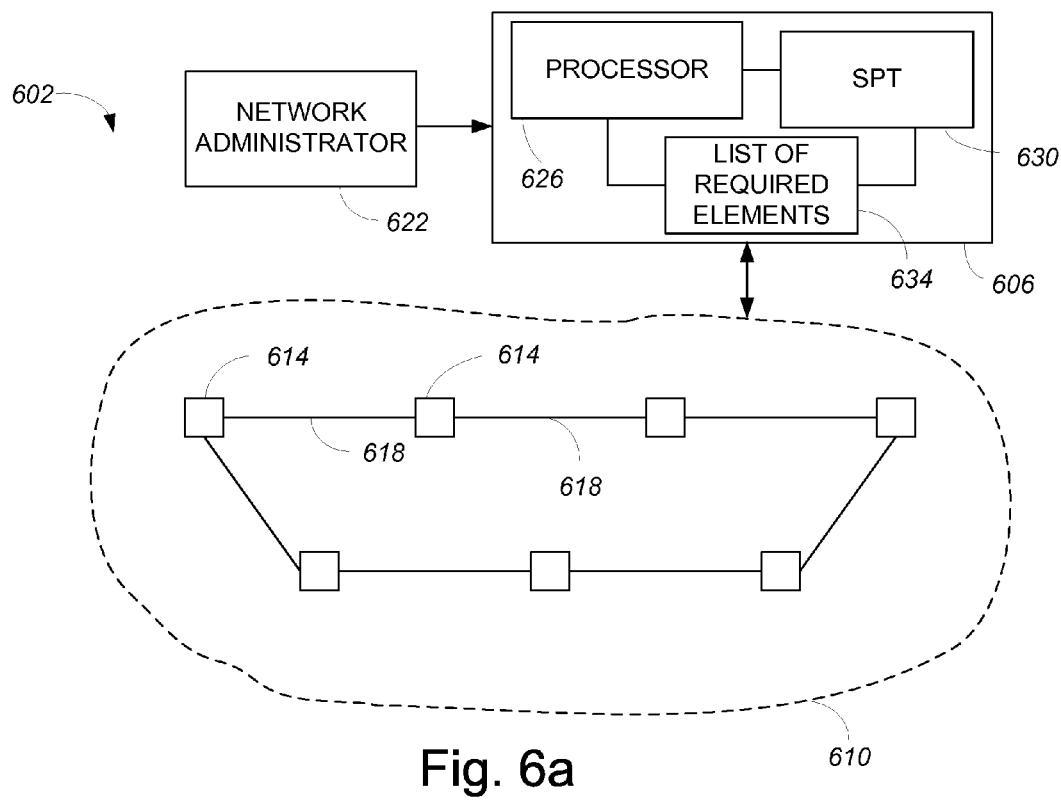
FIG. 6a is a diagrammatic representation of a system in which a path routing algorithm is implemented by a substantially external computing device in accordance with an embodiment of the present invention.

FIG. 6a is a diagrammatic representation of a system in which a path routing algorithm is implemented by a substantially external computing device in accordance with an embodiment of the present invention. An overall system 602 includes a computing device 606 and a network 610. Network 610 generally includes elements such as nodes 614 and links 618. Computing device 606 is in communication with network 610, and is arranged to accept input, e.g., a list of required elements 634, from a user such as a network administrator 622.

Computing device 606 generally includes a processor 626 which is arranged to execute a routing algorithm 630. Although the routing algorithm 630 executed by processor 626 may be substantially any suitable routing algorithm, one particularly suitable routing algorithm is a shortest past first (SPT) algorithm which may use required elements provided by list 634 to identify a shortest path between a specified starting node and a specified ending node which includes the require elements. It should be appreciated, however, that shortest path first algorithm is just one example of a suitable routing algorithm 630, and that routing algorithm 630 may be substantially any type of algorithm.

List 634 generally includes elements which have enough available bandwidth for use in transmitting data. Hence, in one embodiment, links included in the required elements provided by list 634 each have available bandwidth, i.e., are not full. It should be appreciated that required elements in list 634 may include links which are effectively required because those links are the only links within a network which have available bandwidth.

In general, routing algorithm 630 may be embodied in a variety of different forms. For example, routing algorithm 630 may be embodied as a computer program product that stores computer-readable code devices on a memory device, or computer-readable medium, that is associated with a computer. Suitable memory devices include, but are not limited to, a compact disk read-only memory (CD-ROM), a CD-R, a digital video disk (DVD), a hard disk, a tape, a computer disk, or substantially any type of computer memory. Routing algorithm 630 may also be embodied as a data signal embodied in a carrier wave.

Figure 6B:
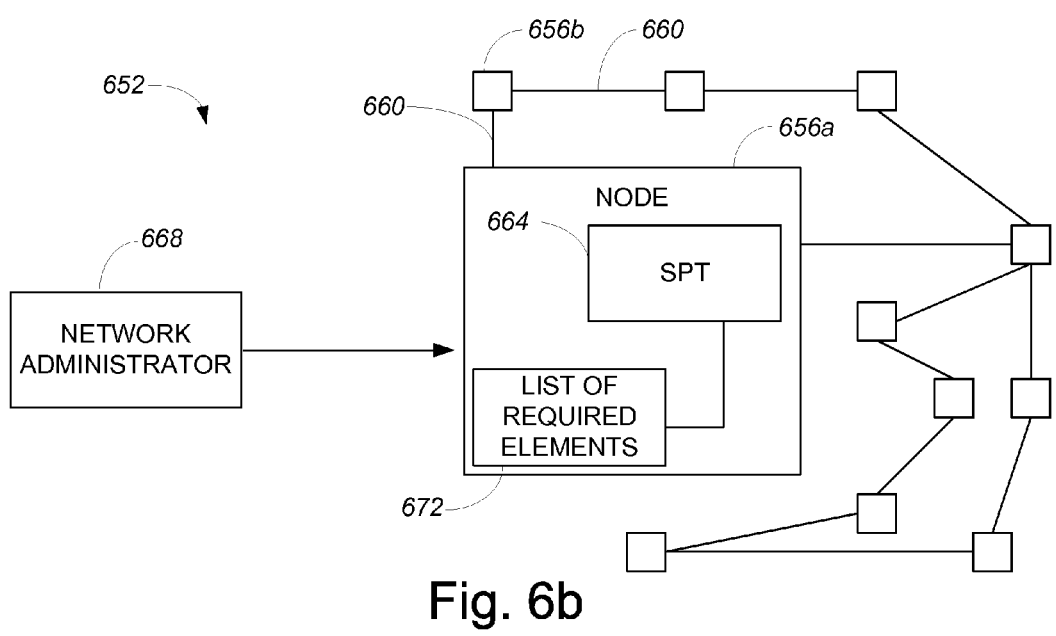
FIG. 6b is a diagrammatic representation of a system in which a path routing algorithm is implemented by a node in accordance with an embodiment of the present invention.

As previously mentioned, a routing algorithm or a route generator may be implemented on computing hardware of a node rather than by a computing device which is in communication with a node. FIG. 6b is a diagrammatic representation of a system in which a path creation algorithm is implemented by a node in accordance with an embodiment of the present invention. An overall system 652 includes a network of nodes 656 and links 660. At least one node 656 is arranged to execute a routing algorithm 664, which may be a shortest path first algorithm. It should be understood that substantially any node 656 which may potentially be a starting node of a circuit path or a starting node of a segment of a circuit path may be capable of executing a routing algorithm. Typically, a routing algorithm is executed by a starting node of a circuit path or, in some cases, a link of the circuit path.

In executing routing algorithm 664, node 656a may take input from a network administrator 668 which specifies elements which are to be included in a circuit path. Network administrator 668 may provide the required elements in the form of a list 672. Using list 672, a circuit path which includes the required elements may be computed by routing algorithm 664.

Figure 7:
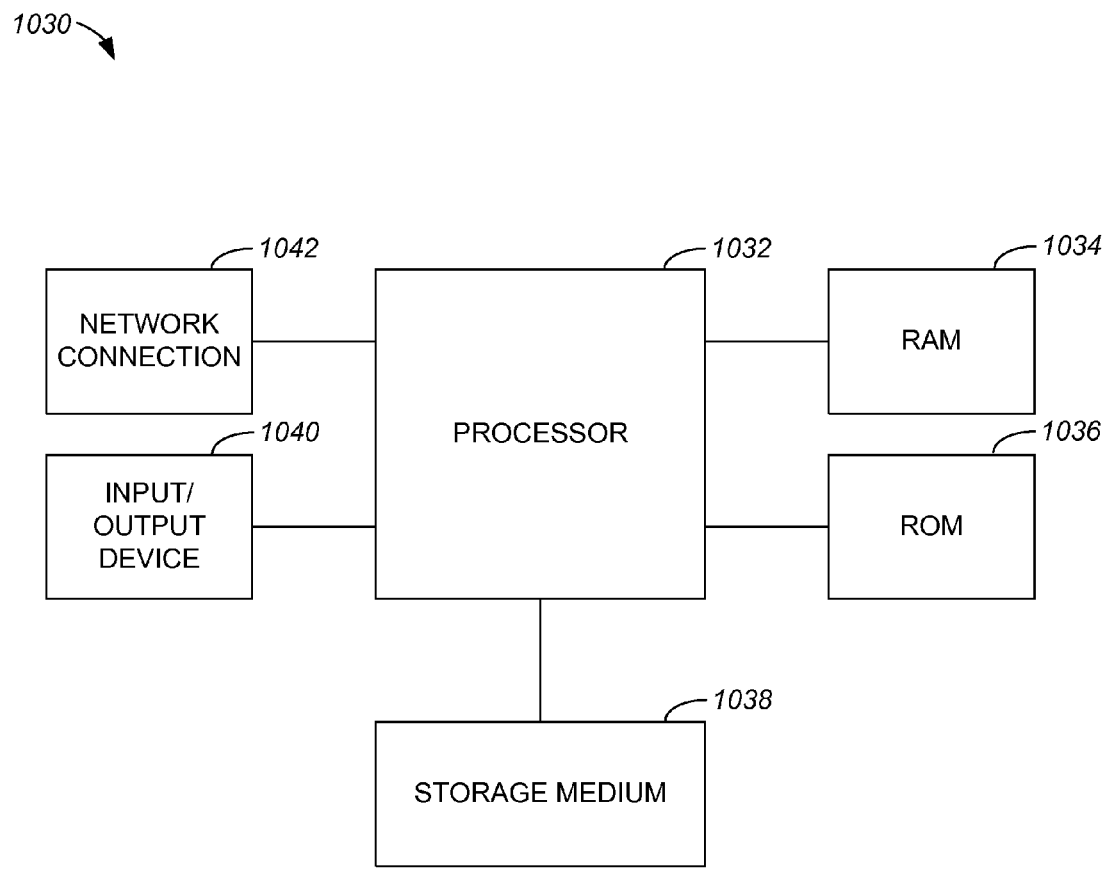
FIG. 7 is a diagrammatic representation of a computer system which is suitable for implementing the present invention.

As previously mentioned, the present invention may be implemented on a computing device. FIG. 7 illustrates a typical, general purpose computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, network elements have generally been described as including network nodes and network links. It should be appreciated, however, that network elements may generally include substantially any device that is part of a network.

The present invention has been described in terms of a set or list of elements which are to be included in a circuit path. However, it should be understood that the present invention may also be applied to the generation of a circuit path which is effectively required to avoid particular elements. That is, rather than computing a path which includes required elements, a routing algorithm may instead compute a path which does not include certain specified elements. For instance, if certain network links are overloaded, a routing algorithm of the present invention may be modified for use in creating a circuit path which does not use the overloaded network links.

A list which is effective for identifying required elements is arranged to be readily maintained and accessed by routing algorithm or a route generator. The form of a list may generally be widely varied depending upon the requirements of a particular routing algorithm. For example, a list may contain a simple listing of all required elements. Alternatively, a list may effectively be configured in a tabular form such that required nodes and required links, for example, are listed under separate headings. Other suitable formats for a list include, but are not limited to, various array formats.

A routing algorithm is generally arranged to identify a set of required elements, as well as the order in which the required elements are to be traversed in a circuit path. A network administrator typically provides both the set of required elements and the sequential order in which the elements are to be traversed. In one embodiment, however, the elements may be traversed in no particular order without departing from the spirit or the scope of the present invention. That is, elements may be traversed in an order which enables the fewest number of links and the fewest number of nodes to be included in the overall circuit path.

While the present invention has been described as being suitable for use with respect to a TDM network that is subject to SONET standards, the present invention is suitable for a variety of different networks. Other suitable networks include, but are not limited to, networks that are subject to a synchronous digital hierarchy (SDH) standard. Further, the methods of the present invention, as well as variations of the methods, are suitable for use with switched ring architectures including, but not limited to, a unidirectional path switched ring (UPSR) architecture.

In general, the steps associated with methods of routing a path which includes specific elements may be widely varied. Steps may be added, removed, altered, or reordered without departing from the spirit or the scope of the present invention. For example, in some situations, it may be necessary to include steps associated with identifying protected links such that protected links are not included as a part of an unprotected circuit path. Therefore, the present examples are to be considered as illustrative and not restrictive, and the invention is not to be limited to the details given herein, but may be modified within the scope of the appended claims.

What is claimed is:

1. A device for creating a path between a first element and a second element, the path being arranged to include a third element, wherein the first element, the second element, and the third element are included in an optical network, the device comprising:
   a processor; and
   a storage device, the storage device being arranged to store computer code for implementing a first mechanism which causes the third element to be identified, the storage device further being arranged to store computer code for implementing a second mechanism which causes the path between the first element and the second element to be computed such that the path traverses the third element, wherein the processor processes the computer codes and the first mechanism is arranged to identify the third element and a fourth element as being components of the path, the fourth element being arranged to be traversed after the third element is traversed, the path including a plurality of segments which includes a first segment associated with the first element and the third element, the second mechanism being further arranged to compute the first segment, the storage device further being arranged to store computer code for implementing a third mechanism which causes the fourth element and the second element to be substantially prevented from being included as a part of the first segment, wherein the second mechanism is further arranged to compute a second segment associated with the fourth element, the second segment being included in the plurality of segments, and wherein the third mechanism is arranged to substantially prevent the first element and the second element from being included as a part of the second segment.

2. A device according to claim 1 wherein the second mechanism is further arranged to compute a third segment associated with the second element, the third segment being included in the plurality of segments, and wherein the third mechanism is arranged to substantially prevent the first element and the third element from being included as a part of the third segment.

3. An apparatus for creating a path between a first element and a second element in an optical network, the path being arranged to include a third element, the apparatus comprising:
   a first means for identifying the third element;
   a second means for computing a path between the first element and the second element such that the path traverses the third element, wherein the first means identifies the third element as being a component of the path and identifies a fourth element as being a component of the path, the fourth element arranged to be traversed after the third element is traversed, the path being arranged to include plurality of segments, the second means being arranged to compute a first segment associated with the first element and the third element, the first segment being included in the plurality of segments; and
   a third means for substantially preventing the fourth element and the second element from being included in the first segment, wherein the second means computes a second segment associated with the fourth element, the second segment being included in the plurality of segments, and wherein the third mean substantially prevents the first element and the second element from being associated with the second segment.

4. An apparatus according to claim 3 wherein the second means computes a third segment associated with the second element, the third segment being included in the plurality of segments, and wherein the third means substantially prevents the first element and the third element from being associated with the third segment.

5. An apparatus for routing a path between a source node and a destination node included within a network, the network further including a plurality of elements, the apparatus comprising:
   an identifier for identifying a set of elements to be included in the path, the set of elements being included in the plurality of elements;
   a blocker for blocking at least a first element included in the set of elements from being used in generating a first segment of the path, wherein the blocker blocks substantially all elements included in the set of elements except for the second element from being used in generating the first segment of the path; and a path router, the path router being arranged to generate the first segment such that the first segment includes the source node and a second element, the second element being included in the set of elements, wherein the first segment does not include the first element and the blocker is arranged to unblock the second element after the first segment is generated and to block at least one element included in the plurality of elements from being included in a second segment of the path, the at least one element included in the plurality of elements being a component of the first segment.

6. An apparatus according to claim 5 wherein the path router is further arranged to generate the second segment such that the second element is a component of the second segment.

7. An apparatus according to claim 5 wherein the blocker is further arranged to block the source node from being included in the second segment.

8. A method for computing a circuit path between a source node and a destination node of an optical network, the method comprising:
identifying at least a first element that is to be traversed by the circuit path between the source node and the destination node;
identifying a second element that is to be traversed by the circuit path between the first element and the destination node;
blocking the second element from being available for use in routing a first segment automatically;
blocking the destination node from being available for use in routing the first segment automatically;
routing the first segment automatically, the first segment being a part of the circuit path, wherein when the first element is a node, the source node and the first element are components of the first segment, routing the first segment automatically including routing the first segment automatically using a shortest path first algorithm to substantially avoid including the second element as a component and substantially avoiding including the destination node as a component;
unblocking the second element such that the second element is available for use in routing a second segment automatically, the second segment being a part of the circuit path;
blocking the source node from being available for use in routing the second segment automatically; and
routing the second segment automatically, wherein the second element is a component of the second segment and the source node is not a component of the second segment.

9. A method as recited in claim 8 further including:
blocking substantially all components of the first segment from being available for use in routing the second segment automatically.

10. A method as recited in claim 9 wherein a terminus of the first segment is a beginning of the second segment, and the terminus of the first segment is not blocked from being available for use in routing the second segment automatically.

11. A method as recited in claim 8 wherein when the first element is a first link, the method further includes:
identifying an initial node of the first link.

12. A method as recited in claim 11 wherein routing the first segment automatically includes routing the first segment from the source node to the initial node of the first link when the first element is the first link.

13. A method as recited in claim 12 further including:
routing a second segment automatically, wherein the first link is included in the second segment.

14. A method as recited in claim 13 further including:
blocking the destination node from being available for use in routing the first segment automatically, wherein routing the first segment automatically further includes routing the first segment to substantially avoid including the destination node as a component.

15. A computer program product:
computer code that causes at least a first element that is to be traversed by the circuit path between the source node and the destination node to be identified;
computer code that causes a second element that is to be traversed by the circuit path between the first element and the destination node to be identified;
computer code that causes the second element to be blocked from being available for use in routing a first segment;
computer code that causes the destination node to be blocked from being available for use in routing the first segment;
computer code that causes the first segment to be routed, the first segment being a part of the circuit path, wherein when the first element is a node, the source node and the first element are components of the first segment, the computer code that causes the first segment to be routed including computer code that causes the first segment to be routed using a shortest path first algorithm and computer code that causes the first segment to be routed to substantially avoid including, the second network element as a component and to substantially avoid including the destination node as a component;
computer code that causes the second element to be unblocked such that the second element is available for use in routing a second segment, the second segment being a part of the circuit path;
computer code that causes the source node to be blocked from being available for use in routing the second segment;
computer code that causes the second segment to be routed, wherein the second element is a component or the second segment and the source node is not a component of the second segment; and
a computer-readable medium that stores the computer codes.

16. A computer program product as recited in claim 15 further including:
computer code that causes substantially all components of the first segment to be blocked from being available for use in routing the second segment automatically.

17. A computer program product as recited in claim 15 wherein when the first element is a first link, the computer program product further includes:
computer code that causes an initial node or the first link to be identified.

18. A computer program product as recited in claim 17 wherein the computer code that causes the first segment to be routed automatically includes computer code that causes the first segment to be routed from the source node to the initial node of the first link when the first element is the first link.

19. A computer program product as recited in claim 18 further including:

computer code that causes a second segment to be routed automatically, wherein the first link is included in the second segment.

20. A computer program product as recited in claim 17 wherein the computer-readable medium is one selected from the group consisting of a hard disk, a CD-ROM, a DVD, a computer disk, a tape drive, a computer memory, and a data signal embodied in a carrier wave.

* * * * *